United States Patent [19]

Greenhill

[11] Patent Number: 4,752,178

[45] Date of Patent: Jun. 21, 1988

[54] WAVED RETAINING RING

[75] Inventor: Michael Greenhill, Deerfield, Ill.

[73] Assignee: Smalley Steel Ring Company, Wheeling, Ill.

[21] Appl. No.: 942,602

[22] Filed: Dec. 17, 1986

[51] Int. Cl.[4] ............................................. F16B 21/18
[52] U.S. Cl. ................................... 411/521; 403/326; 411/545
[58] Field of Search ................................ 411/545–547, 411/520, 521, 517, 160–162; 403/326

[56] References Cited

U.S. PATENT DOCUMENTS

| 361,298 | 4/1887 | Kilmer . | |
| 491,173 | 2/1893 | Hayward | 411/162 X |
| 1,139,732 | 5/1915 | Slick . | |
| 1,181,173 | 5/1916 | Schubert . | |
| 1,849,604 | 3/1932 | Weatherhead | 411/521 X |
| 2,255,217 | 9/1941 | Hill . | |
| 2,330,102 | 9/1943 | Yarnall | 411/547 X |
| 2,450,425 | 10/1948 | Frisby . | |
| 2,456,572 | 12/1948 | Wagstaff . | |
| 2,798,748 | 7/1957 | Maurer . | |
| 2,893,717 | 7/1959 | Simmons . | |
| 2,902,303 | 9/1959 | Davis . | |
| 2,982,323 | 5/1961 | Vossloh et al. . | |
| 2,985,054 | 5/1961 | Bramberry et al. . | |
| 3,021,129 | 2/1962 | Maker . | |
| 3,319,508 | 5/1967 | McCormick . | |
| 3,391,910 | 7/1968 | Prahl | 261/94 |
| 3,397,726 | 8/1968 | Gohs | 411/187 |
| 3,417,650 | 12/1968 | Varrin | 411/517 |
| 3,535,977 | 10/1970 | Baumgarten | 411/517 |
| 3,608,601 | 9/1971 | Gohs | 411/187 |
| 3,884,589 | 5/1975 | Liedholm . | |
| 4,019,824 | 4/1977 | Percy . | |
| 4,405,251 | 9/1983 | Kolchinsky et al. | 403/326 X |

FOREIGN PATENT DOCUMENTS

| 3509499 | 9/1986 | Fed. Rep. of Germany | 411/545 |
| 935042 | 1/1948 | France | 411/545 |

OTHER PUBLICATIONS

Application Checklist for Wave Springs, Smalley Steel Ring Co., Wheeling, Ill.
Application Checklist for Spiral Retaining Rings, Smalley Steel Ring Co., Wheeling, Ill.
"Engineering Design Data and Applications for Edgewood Processed Wave Springs", *Smalltalk*, No. 1, Smalley Steel Ring Co., Wheeling, Ill.
"Fundamentals in the Selection of "Flat Wire" Spring Materials,"[11] *Smalltalk*, vol. 8, No. 4, Smalley Steel Ring Co., Wheeling, Ill.

Primary Examiner—Lloyd A. Gall
Attorney, Agent, or Firm—Lockwood, Alex, FitzGibbon & Cummings

[57] ABSTRACT

A circular waved retaining ring is formed from two turns of a flat elongate wire strip and which follow a continuous sinusoidal wave path that includes a series of waves equidistantly spaced about the ring wavepath, each wave having a shoulder portion which bears against generally parallel surfaces of the working elements positioned on a shaft or in a cylinder bore. The ring fits in a rectangular groove formed either on a shaft or in a cylinder bore, the width of the groove being slightly greater than the distance between successive wave crests and troughs.

8 Claims, 2 Drawing Sheets

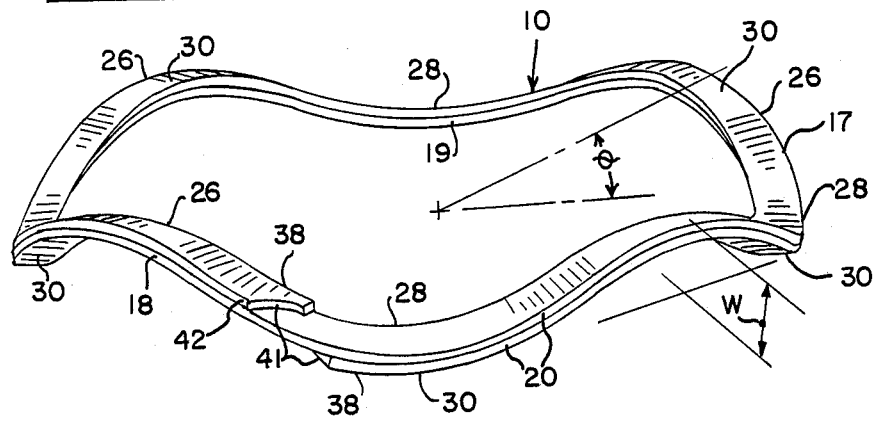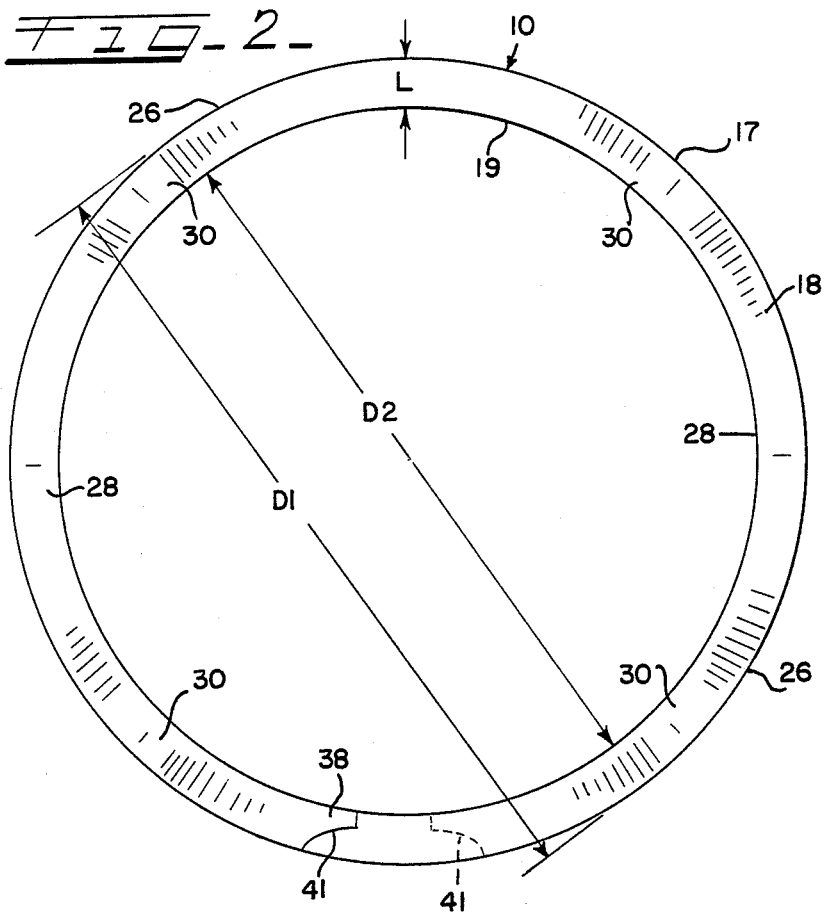

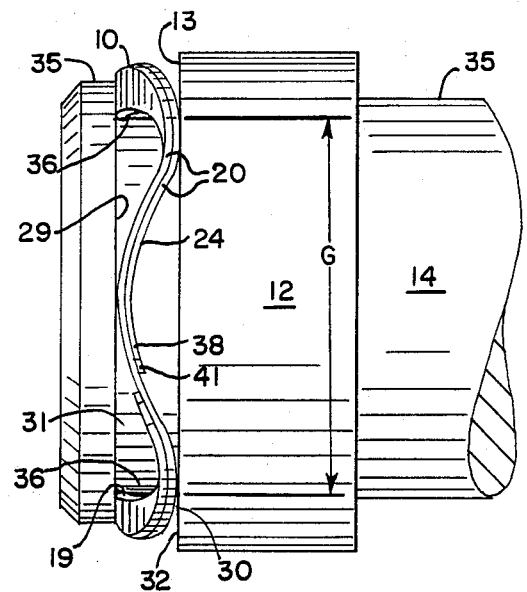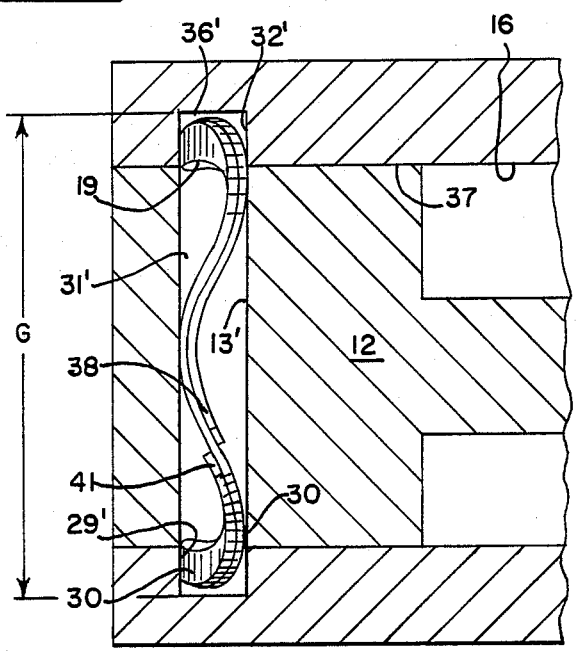

WAVED RETAINING RING

BACKGROUND AND SUMMARY OF THE INVENTION

This invention relates generally to retaining rings and more particularly to retaining rings made from an elongate flat strip which is coiled upon itself and formed into a wave configuration.

Retaining rings are widely used in many fields to retain working elements on either shafts or within cylinder bores. When retaining rings are used on cylindrical shafts to retain a plurality of working elements assembled thereon, it is desirable that such rings retain the elements in their specific working positions on the shaft by applying a substantial pressure on the elements. The shaft elements, however, may be manufactured with a tolerance; that is the elements may either exceed their specified nominal longitudinal distance or be slightly thereunder. In the first instance where the shaft elements are oversized, the shaft elements will intrude into the retaining ring location on the shaft. In the second instance where the shaft elements are undersized, the retaining ring may not bear against the elements and thus the elements may travel along the shaft. Therefore, it is necessary in the prior art that retaining ring grooves be located in a precise position on the working member.

Typically, circular retaining rings are held in position in a circumferential channel on a shaft. These circular retainer rings should preferably exert a uniform pressure on the shaft elements around the entire circumference of the shaft to prevent any radial misalignment between the shaft elements and the binding thereof. Prior attempts to achieve this pressure have utilized retaining rings having a dished-type configuration, such as that shown in U.S. Pat. No. 3,319,508, wherein the outer edge of the ring which engages the shaft components is offset from the ring's inner edge. Retaining rings of this type require a particular configuration of the shaft channel or groove such as the beveled groove shown therein, so as to provide proper positioning for the retaining ring against the shaft elements. Retaining rings which sit in non-rectangular grooves, such as beveled grooves, are more likely to undergo ring shear than those in rectangular grooves, and are likely to "ride" out of those grooves.

In a retaining ring incorporating the principles of the present invention a circular retaining ring is formed from a flat wire strip into a continuous circular and substantially sinusoidal wavepath in which successive wave crests and troughs include load supporting shoulders which engage the working elements and a radial wall of the groove of the working member. The ring contains a minimum of three waves equidistantly spaced on the wavepath to ensure uniform abutting engagement with the groove and the working element.

The present invention is directed to a construction which avoids the abovementioned shortcomings.

Accordingly, it is a general object of the present invention to provide a new and improved retaining ring for use on axial shafts or in cylinder bores.

It is another object of the present invention to provide a multiturn retaining ring which applies a uniform pressure on working elements which are over or under dimensioned.

It is a further object of the present invention to provide a retaining ring in the form of a multiturn waved ring having a series of waves which include shoulder portions which abut against the working element and the retaining ring groove.

It is still a further object of the present invention to provide a waved retaining ring which exerts a uniform pressure on working elements.

It is still yet a further object of the present invention to provide a compressible retaining ring for use in an annular rectangular groove which ring is capable of a preselected amount of deflection, thereby eliminating the need for precise positioning of the groove with respect to the working elements.

These and other objects, features and advantages of the present invention will be clearly understood through a consideration of the following detailed description.

DETAILED DESCRIPTION OF THE INVENTION

In the course of this description, reference will be made to the attached drawings in which:

FIG. 1 is a perspective view of a wave spring retaining ring according to the present invention;

FIG. 2 is a plan view of the retaining ring shown in FIG. 1;

FIG. 3 is a sectional view of a retaining ring of the present invention in an operating position assembled on an axial shaft; and FIG. 4 is a sectional view of a retaining ring of the present invention assembled in a cylindrical bore.

Referring now to the drawings, a waved retaining ring 10 constructed in accordance with the principles of the present invention is employed to prevent substantial lateral movement of either working elements 12 positioned on a longitudinal shaft 14 (FIG. 3) or working elements 12 held within a cylindrical bore 16 (FIG. 4), each working element having a surface 13 generally perpendicular to the axis of the shaft or groove.

The retaining ring 10 is formed from a single, flat elongate metal strip 18 which is wound about one of its lateral edges 19 in a generally circular pattern to form a multiturn ring in which the consecutive turns 20 of the ring 10 are closely spaced together and lie adjacent one another. Each flat turn is generally parallel to its adjacent turn. The strip is formed into a continuous wavepath 24 composed of a series of successive similar wave crests 26 and troughs 28. The wave path 24 is continuous and substantially sinusoidal in nature.

The wavepath of the ring is introduced during the edge winding of the ring and so presents a uniform, smooth and continuous sinusoidal path, and thereby forms support surfaces or shoulder portions 30 which engage one surface 13 of the closest working element 12 and one wall 29 of the shaft groove opposing the working element surface 13. The edge winding of the ring avoids any abrupt peaks or ridges which are a typical byproduct of die-stamping. The metal strip 18 is edge wound at a slight radial angle $\theta$ with respect to the inner and outer edges of the ring so that the transverse surface of the strip 18 (including the shoulders 30) are angled either upwardly or downwardly. (The ring in FIG. 1 is shown angled upwardly, i.e. the outer edge 17 of the ring is elevated with respect to the inner edge 19.)

In operation, the retaining ring 10 fits within an annular groove 31, 31' having a generally rectangular cross-section and which is formed in either a cylindrical shaft 14 or cylinder bore 16 proximate to the extent of the shaft or bore elements. The undeflected free height (or width W) of the ring 10 prior to any shaft or bore element loading, is equal to the distance between successive wave crests 26 and troughs 28. That distance is also slightly less than the width of groove 31, 31'. When installed, the ring shoulder portions 30 will abut the proximate surface 13, 13' of working elements 12 and the opposing wall 29, 29' of the groove 31, 31'. The waves are preferably symmetrically and equally spaced about the 360° of the wavepath of the ring so as to evenly engage the radial surface of the working element 12. It is preferred that a minimum of three complete waves are formed so that the ring has a minimum three wave crests and three wave troughs which are equally spaced apart from each other to thereby apply a substantially uniform pressure on the working element 12.

As shown in FIGS. 3 and 4, the retaining ring 10 is adapted to retain working elements 12 used in association with either a generally cylindrical shaft 14 or in a generally cylindrical bore 16. To accommodate the ring 10, each shaft or bore is provided with an annular groove 31, 31' having a generally rectangular cross-sectional configuration. The inner walls 29, 29' and 32, 32' of the groove 31, 31' are preferably parallel to the element surface 13 so as to provide the ring with a solid retaining surface to engage. When the application is on a shaft, such as shown in FIG. 3, the groove 31 opens radially outwardly at the shaft surface 35 opposite the groove inner diameter 36. When the application is in a bore, the groove 31' opens radially inwardly at the cylinder wall 37 opposite the groove inner diameter 36'. In both of the above applications, the width, W, of the ring 10 represents the undeflected height of the ring which is preferably slightly less than the width of the annular groove such that the wave crests 26 and troughs 28 of the retaining ring fit somewhat loosely within the walls of the grooves 31, 31' to allow for greater ease of installation. Because the waved configuration of the ring allows it to undergo a predetermined amount of compression, the ring 10 can be compressed when it is installed adjacent the working element 12 if the element is slightly oversized or so positioned on the shaft assembly.

It has been found that two complete turns or wraps of the flat strip throughout the ring circumference of 360° provide the best operating advantages, in that the turns, in conjunction with the ring's waved configuration enables the ring to exhibit characteristics of a spring as opposed to a flat circular ring. Additionally, the two turns assist the ring is applying pressure on the work element uniformly throughout 360°. The ends 38 of the ring turns are free, so that the ring can be circumferentially expanded or contracted to simplify its installation over shafts or in bores. The free ends 38 of the strip are preferably located on an incline of a wave so as not to introduce an additional thickness at the shoulder portions 30. Once one free end of the ring is inserted into the shaft or bore channel, the ring may be spiraled into the channel and will return to its original diameter to fit as desired within the groove 31.

When the ring 10 is used in internal applications such as the cylinder bore 16 as depicted in FIG. 4, it is preferred that the outside diameter $D_1$ of the ring be less than the groove diameter 36' (G) to prevent the binding or hang-up of the ring 10 in the groove 31' when the ring is either at its undeflected height or when compressed by a working element. When the ring 10 is compressed, the ring turns 20 move with respect to each other and the ring grows radially outwardly toward the bore groove diameter 36'. If the ring outer diameter $D_1$ is too large, binding occurs which undesirably prevents the ring shoulders 30 from bearing upon the groove opposing face 29' because the ring will engage the cylinder groove diameter. In this condition, the load applied to the ring by work element 12 will change and the ring will no longer deflect uniformly when loaded and lose its desireable spring characteristics. Therefore, the maximum outside diameter $D_1$ of the ring must also be slightly less than the groove diameter G when the ring 10 is compressed to 80% of its total available axial deflection.

Likewise, in external or shaft applications, it is desirable that the ring inner diameter $D_2$ be less than the shaft groove diameter 36 (G) so that the ring is in contact with the shaft groove both when the ring is undeflected and when the ring is compressed to its loading condition (80% of its undeflected height) so that the ring 10 engages the shaft groove diameter 36.

In an important aspect of the present invention and as mentioned before, the ring strip 18 is angled so that when the ring is compressed to its maximum working height (equal to 80% of its undeflected height or W) the plane of the shoulders 30 will become substantially parallel to the working element surface 13.

To facilitate the removal of the rings 10 from the annular grooves 31, 31', the free ends 38 of the rings are provided with notches 41 at the common edge 42 of the free ends which engage the longitudinal walls 36, 36' of the working member annular grooves 31, 31'. The user can insert a screwdriver or other blunt object into the notch and pry it out of the groove. The notches 41 should preferably not extend deeper than either one-half or one-third the width of the strip L so as to provide a sufficient contact point for removing the ring from the groove (as shown in FIGS. 1 and 2). Where the ring is used in external applications, the notches are located on the inside edge of the ring. Likewise, where the ring is used in internal applications, the notches are located on the ring outside edge.

It will be appreciated that the embodiments of the present invention which have been discussed are merely illustrative of a few of the applications of the principles of the inventions. Numerous modifications may be made by those skilled in the art without departing from the true spirit and scope of the invention.

What I claim is:

1. A retaining ring assembly for axially securing at least one work element to an axial shaft and maintaining the work element in a preselected position on the shaft by exerting a uniform pressure on said work element, the combination comprising:

a generally cylindrical axial shaft adapted to receive at least one work element thereon and including an annular groove having a substantially rectangular configuration with two planar groove walls generally perpendicular to the axial shaft surface, the groove opening radially outwardly at the outer radial surface of said shaft between the groove walls opposite the groove diameter; at least one work element positioned on said shaft proximate to said groove, said groove being located on said shaft in a plane generally parallel to said work element; and, a circular, resilient, compressible waved retaining ring for retaining said work element on said axial shaft and applying a retaining force thereto, the ring being adapted to fit snugly on said shaft in said groove, said ring being formed from an elongate flat wire strip wound in a circle around a common edge to form at least two turns of wire and having two free ends so as to allow relative movement of said strip between said turns, each of the turns lying adjacent each other and generally parallel to each other so as to form a multiturn ring, said ring having at least three waves which engage said work element and said radial groove, said waves including successive crest and trough portions spaced equidistant from each other about the circumference fo said shaft, said waves defining a continuous and substantially sinusoidal curve, such that shoulder portions located on the wave crests and troughs abuttingly engage a surface of said work element and one planar groove wall of said shaft groove respectively, at separate portions equal in number to the number of waves and spaced equidistant from each other which apply a uniform pressure to said work element via said separate shoulder portions, said ring further having an undeflected free height which is equal to the distance between successive wave crests and troughs, said undeflected free height being slightly less than the width of said shaft groove, and the inner diameter of said ring in an uninstalled state being slightly less than the diameter of said shaft groove such that the inner edges of adjacent ring turns snugly engage said shaft groove diameter when installed on said shaft groove.

2. The combination of claim 1, wherein said ring further includes means for removing said ring from said shaft including notches on the free ends of said wire strip, said notches being equal to between one-half and one-third of the total width of said strip.

3. The combination of claim 1, wherein said ring includes four waves with successive crest and trough portions.

4. The combination of claim 1, wherein said ring strip is wound with a slight radial angle such that one edge of said ring strip is angularly disposed with respect to the other edge of said ring strip at the undeflected height of said ring, whereby when said ring height is deflected due to loading by said work element, said shoulder portions become substantially parallel to said work element surface and at least one of said shaft groove planar walls and fully abuttingly engage said work element and shaft groove planar wall.

5. In a retaining ring assembly for axially securing at least one work element within a cylindrical bore, and maintaining the work element in a preselected position within said bore by maintaining a uniform pressure on said work element, the combination comprising:
a generally cylindrical bore adapted to receive at least one work element in sliding engagement therein, the bore including an annular groove having a substantially rectangular configuration with two planar groove walls generally perpendicular to the cylindrical bore surface, the groove opening radially inwardly at the inner radial bore surface of said bore between the groove walls opposite the groove diameter; at least one work element positioned within said bore proximate to said groove, said groove being located in said bore in a plane generally parallel to said work element; and, a circular, resilient, compressible waved retaining ring for retaining said work element in said bore, the ring being adapted to fit within said bore, said ring being formed from at least two annular turns of an elongate flat wire strip wound in a circle around a common edge of said strip and having two free ends so as to allow relative movement of said strip between the turns, each of said turns lying adjacent each other and generally parallel to each other so as to form a multiturn circular ring having at least three waves which engage said work element and said bore groove, said waves including successive crest and trough portions spaced equidistant from each other about the circumference of said bore, said waves defining a continuous and substantially sinusoidal curve, said wave crests and troughs including shoulder portions thereon which abuttingly engage a surface of said work element and one planar groove wall of said bore groove respectively, at separate portions equal in number to the number of waves and spaced equidistant from each other which apply a uniform pressure on said work element via said separate shoulder portions, said ring having an undeflected free height equal to the distance between the successive wave crests and troughs, said undeflected height further being slightly less than the width of said bore groove, and the maximum outer diameter of said ring being slightly less in both an uninstalled and installed state than said groove diameter such that the outer edges of said ring do not contact said groove diameter when installed in said bore and loaded by said bore work element.

6. The combination of claim 5, wherein said ring further includes means for removing said ring from said bore including notches on the free ends of said wire strip, said notches being equal to between one-half and one-third of the total width of said strip.

7. The combination of claim 5, wherein said ring includes four waves with successive crest and trough portions.

8. The combination of claim 5, wherein said ring strip is wound with a slight radial angle such that one edge of said ring strip is angularly disposed with respect to the other edge of said ring strip at the undeflected height of said ring, whereby when said ring height is deflected by the loading of said work element, said shoulder portions become substantially parallel to said work element surface and at least one of said bore groove planar walls and said shoulder portions fully abuttingly engage said work element and bore groove planar wall and apply a retaining force to said work element.

* * * * *

UNITED STATES PATENT AND TRADEMARK OFFICE
CERTIFICATE OF CORRECTION

PATENT NO. : 4,752,178
DATED : June 21, 1988
INVENTOR(S) : Michael Greenhill

It is certified that error appears in the above-identified patent and that said Letters Patent is hereby corrected as shown below:

```
On the Title Page,
in the ABSTRACT, line 2, after "strip" delete "and".
Col. 2, line 22, "wave spring" should read --waved--.
Col. 3, line 49, "is" should read --in--.
Col. 5, line 11, "fo" should read --of--.
```

Signed and Sealed this

Eighth Day of August, 1989

Attest:

DONALD J. QUIGG

*Attesting Officer*   Commissioner of Patents and Trademarks